March 22, 1949.  G. M. DINNICK  2,464,967
WELDING MACHINE
Filed Oct. 3, 1944
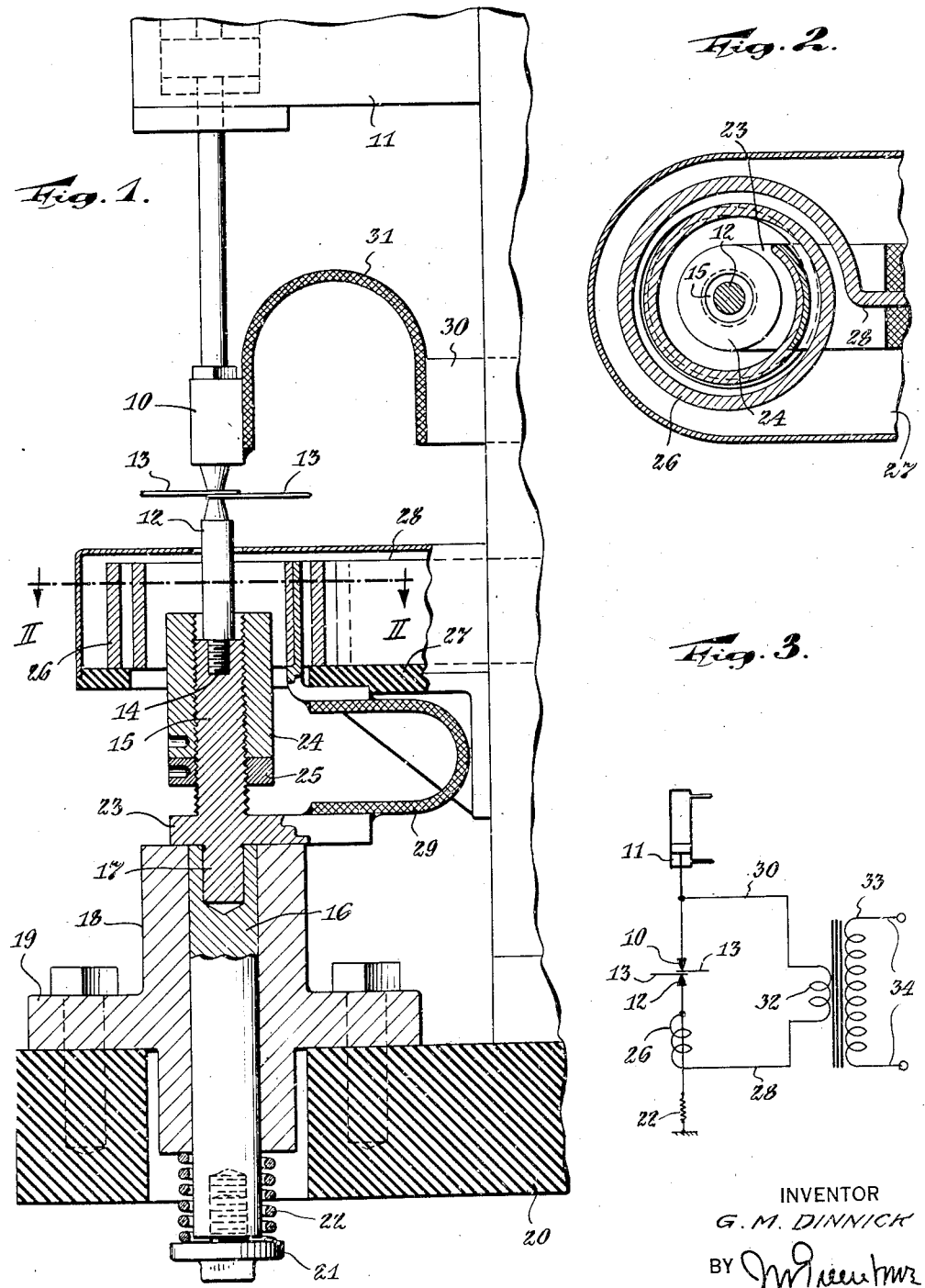
INVENTOR
G. M. DINNICK
BY
ATTORNEY Patented Mar. 22, 1949

2,464,967

UNITED STATES PATENT OFFICE 2,464,967

WELDING MACHINE

George M. Dinnick, Bloomfield, N. J., assignor to Westinghouse Electric Corporation, East Pittsburgh, Pa., a corporation of Pennsylvania Application October 3, 1944, Serial No. 556,933

2 Claims. (Cl. 219—4)

This invention relates to welding machines and more particularly to electric welders.

In some welding operations of which the welding of aluminum is a notable example, an increase of pressure or forging at the point of welding is required during the application of the welding heat. Broadly considered, the present invention contemplates the accomplishment of the desideratum by simple and effective means.

From a general aspect likewise, the invention is directed to performing the desired operation electrically.

An essential object of the invention is to obtain automatic and precisely timed application of the forging pressure to correspond exactly with the application of the welding heat at the place of weld.

A further object of the invention is to proportion the pressure to the thickness of materials or character of weld.

Another object of the invention is to apply the forging pressure by utilization of the welding current.

Other objects of the invention will appear to those versed in the art to which it appertains as the description proceeds, both by direct mention thereof and by implication from the context.

Referring to the accompanying drawing in which like reference characters indicate the same or equivalent parts throughout the several views:

Figure 1 is a section of a part of a welding machine on a plane longitudinally of the axis of the welding electrodes showing my invention applied thereto.

Figure 2 is a cross-section on line II—II of Fig. 1; and

Figure 3 is a showing of the electrical circuit employed in carrying out the invention.

In the specific embodiment of the invention illustrated in said drawing, the reference numeral 10 designates an upper electrode shown vertically positioned and longitudinally movable in accordance with prior art welding practice. Said upper electrode is movably carried in a fixed head or bracket 11 wherein it is manually or otherwise controlled in its vertical movement by the operator as usual. Alined with the upper electrode is a lower electrode 12, and it is between the upper and lower electrodes that work piece 13 is positioned on which the welding operation is to be performed.

The lower electrode 12 is shown removably secured, as by threaded stem 14, in the upper end of a carrier 15 in turn mounted upon the upper end of a plunger 16 by a dowel 17 depending from the carrier into the end of the plunger and welded, soldered or otherwise made integral therewith. Said plunger is slidably mounted in a support or bushing 18 having a flange 19 for mounting the same on a table or other base 20 of insulative material. The lower end of the plunger is shown provided with a cap 21 and between said cap and lower end of bushing 18 is a compression spring 22 of sufficient strength to overcome friction between the plunger and bushing to supplement gravity and to be assured of lowering of the plunger when not positively actuated upwardly. Limitation as to lowermost position of the plunger is accomplished in the present showing by a lateral projection 23 on carrier 15 situated at the upper end of the plunger 16 and adapted to rest upon the upper end of the bushing 18 when in normal or lowermost position.

Above lateral projection 23, carrier 15 extends vertically and is screw threaded on its outer surface, receiving an iron and internally threaded sleeve 24 thereon, which constitutes a vertically adjustable solenoid core. A lock nut 25 is shown on said carrier at the lower end of said sleeve 24, and is likewise preferably of iron and both said sleeve and lock nut are cylindrical and of same diameter for functioning together as the core.

A magnetic coil 26 capable of functioning with high amperage current is carried on an insulating bracket 27 around the lower electrode and partially above said core so that magnetic flux of the coil will exert an upward impetus on the core and effective upon the electrode to give it a forceful upward surge. Intensity of that surge may be varied by appropriate adjustment of the core 24 on carrier 15.

The upward surge of the lower electrode, to function as a forging pressure, should occur substantially simultaneously with the application of the welding heat. To accomplish this desideratum the welding current is carried in series through solenoid coil 26. This has the further beneficial effect of varying the magnetic flux in proportion to the welding current. Thus for heavy work requiring a larger welding current, the magnetic flux and therefore the forging pressure, is greater than for light work drawing a less welding current. As shown in Figures 1 and 2, one current terminal 28 leads in by way of the outer convolution of magnetic coil 26 and connects from the inner convolution to and through a flexible lead 29 to carrier projection 23 and thus to the lower electrode. The other current terminal 30 connects to a flexible lead 31 in turn connecting with the upper electrode 10. The circuit is extended in Figure 3 to show the terminals 28 and 30 as leading from the secondary 32 of a transformer 33 suitably supplied with alternating current from a power line 34.

In operation, the operator applies the work between the electrodes as usual, and then causes the upper electrode to lower. When both electrodes are in engagement with the work, current flows and produces the welding heat. As the current is also flowing through the solenoid coil, a forging pressure is exerted by the lower electrode against the work in the nature of a hammer blow.

The resultant weld is vastly improved by application of this blow or forging pressure substantially simultaneously with application of the welding heat, and my apparatus automatically times the blow with the application of the heat.

I claim:

1. An electric welder comprising an electric circuit and two electrodes adapted to receive a piece of work therebetween, both of said electrodes being movable toward each other and said circuit being in series with said electrodes and completed by closing a first one of said electrodes against the work and with the work in engagement with a second one of said electrodes, electro-magnetic means in the same series circuit through the electrodes and work, thereby subject to the same current flow as flows through the electrodes and work and effective upon said second electrode and comprising the sole means for moving the second electrode toward the first electrode and effective only during completion of the circuit by engagement of the first electrode with the work and the work with the second electrode, the completed circuit thereby both applying welding heat to the work between the electrodes and applying a forging pressure of the second electrode toward the work and first electrode.

2. An electric welder comprising an electric circuit and two electrodes adapted to receive a piece of work therebetween, both of said electrodes being movable toward each other and said circuit being in series with said electrodes and completed by closing a first one of said electrodes against the work and with the work in engagement with a second one of said electrodes, electro-magnetic means in the same series circuit through the electrodes and work, thereby subject to the same current flow as flows through the electrodes and work and effective upon said second electrode and comprising the sole means for moving the second electrode toward the first electrode and effective only during completion of the circuit by engagement of the first electrode with the work and the work with the second electrode, the completed circuit thereby both applying welding heat to the work between the electrodes and applying a forging pressure of the second electrode toward the work and first electrode, said first electrode being movable away from the work for opening the circuit and thereby discontinuing both the application of welding heat and of forging pressure.

GEORGE M. DINNICK.

REFERENCES CITED

The following references are of record in the file of this patent:

UNITED STATES PATENTS

| Number | Name | Date |
| --- | --- | --- |
| 1,078,675 | Heany | Nov. 18, 1913 |
| 1,976,552 | Friesen | Oct. 9, 1934 |
| 2,004,619 | Tarbox | June 11, 1935 |
| 2,089,213 | Labodie | Aug. 10, 1937 |
| 2,315,916 | Whiteley et al. | Apr. 6, 1943 |
| 2,401,528 | Vang | June 4, 1946 |

FOREIGN PATENTS

| Number | Country | Date |
| --- | --- | --- |
| 371,066 | Germany | Mar. 10, 1923 |